US011184491B2

(12) United States Patent
Tojo et al.

(10) Patent No.: US 11,184,491 B2
(45) Date of Patent: Nov. 23, 2021

(54) INFORMATION PROCESSING APPARATUS AND NON-TRANSITORY COMPUTER READABLE MEDIUM FOR COLLECTIVE DELETION OF PLURAL SCREEN DISPLAY ELEMENTS

(71) Applicant: FUJIFILM BUSINESS INNOVATION CORP., Tokyo (JP)

(72) Inventors: Takahiro Tojo, Kanagawa (JP); Masakazu Ketsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/542,475

(22) Filed: Aug. 16, 2019

(65) Prior Publication Data

US 2019/0373120 A1 Dec. 5, 2019

Related U.S. Application Data

(63) Continuation of application No. 16/123,536, filed on Sep. 6, 2018, now abandoned.

(30) Foreign Application Priority Data

Sep. 20, 2017 (JP) .............................. JP2017-179991

(51) Int. Cl.
*H04N 1/00* (2006.01)

(52) U.S. Cl.
CPC ..... *H04N 1/00395* (2013.01); *H04N 1/00389* (2013.01); *H04N 1/00411* (2013.01); *H04N 1/00424* (2013.01); *H04N 2201/0094* (2013.01)

(58) Field of Classification Search
CPC .................................................. H04N 1/00395
(Continued)

(56) References Cited

U.S. PATENT DOCUMENTS

2004/0267793 A1* 12/2004 Sato ..................... G11B 27/105
2016/0239200 A1* 8/2016 Fang ................... G06F 3/04883
(Continued)

FOREIGN PATENT DOCUMENTS

CN 105739826 A 7/2016
JP H09-292960 A ‡ 11/1997
(Continued)

OTHER PUBLICATIONS

Apr. 16, 2019 Office Action issued in U.S. Appl. No. 16/123,536.
Jun. 29, 2021 Office Action issued in Japanese Patent Application No. 2017-179991.

*Primary Examiner* — Jacky X Zheng
(74) *Attorney, Agent, or Firm* — Oliff PLC

(57) ABSTRACT

An information processing apparatus includes a display, a reception unit, and a display controller. The display is capable of displaying, as components displayed on a screen, plural screen display elements on the screen. The reception unit receives a collective deletion instruction as an instruction for collectively deleting the plural screen display elements displayed by the display. The display controller performs, in response to reception of the collective deletion instruction by the reception unit, in a case where the plural screen display elements for which the collective deletion instruction is issued satisfy a predetermined condition, control such that plural confirmation screens for confirming whether or not deletion is to be made, the plural confirmation screens including different information contents, are displayed on the display on a step-by-step basis.

13 Claims, 20 Drawing Sheets

(58) Field of Classification Search
USPC .......................................................... 358/1.15
See application file for complete search history.

(56) References Cited

U.S. PATENT DOCUMENTS

2018/0088779 A1* 3/2018 Kusano ............... G06F 3/04817
2018/0234564 A1* 8/2018 Hirasawa ........... H04N 1/00506

FOREIGN PATENT DOCUMENTS

| | | | |
|---|---|---|---|
| JP | H09-292960 A | | 11/1997 |
| JP | 2010-157089 A | | 7/2010 |
| JP | 2013-105202 A | | 5/2013 |
| JP | 2014-107729 A | | 6/2014 |
| JP | 2015-194941 A | ‡ | 11/2015 |
| JP | 2015-194941 A | | 11/2015 |
| JP | 2016-018496 A | | 2/2016 |

\* cited by examiner
‡ imported from a related application

FIG. 9

USER A | PRIVATE PRINT | UPDATE DISPLAY | CLOSE

40

☑ INVOICE FOR MONTH A  1 PAGE  2 COPIES  COLOR  SINGLE-SIDED  A4

☑ DETAILED STATEMENT LIST  3 PAGES  1 COPY  MONOCHROME  DOUBLE-SIDED  A4

☐ ORGANIZATION CHART  1 PAGE  1 COPY  MONOCHROME  SINGLE-SIDED  A3

SELECT ALL | DELETE | PREVIEW | PRINT

INFORMATION PROCESSING APPARATUS AND NON-TRANSITORY COMPUTER READABLE MEDIUM FOR COLLECTIVE DELETION OF PLURAL SCREEN DISPLAY ELEMENTS

CROSS-REFERENCE TO RELATED APPLICATIONS

This is a Continuation of application Ser. No. 16/123,536 filed Sep. 6, 2018, which claims the benefit of priority from Japanese Patent Application No. 2017-179991 filed Sep. 20, 2017. The disclosures of the prior applications are hereby incorporated by reference herein in its entirety.

BACKGROUND

Technical Field

The present invention relates to an information processing apparatus and a non-transitory computer readable medium.

SUMMARY

According to an aspect of the invention, there is provided an information processing apparatus including a display, a reception unit, and a display controller. The display is capable of displaying, as components displayed on a screen, plural screen display elements on the screen. The reception unit receives a collective deletion instruction as an instruction for collectively deleting the plural screen display elements displayed by the display. The display controller performs, in response to reception of the collective deletion instruction by the reception unit, in a case where the plural screen display elements for which the collective deletion instruction is issued satisfy a predetermined condition, control such that plural confirmation screens for confirming whether or not deletion is to be made, the plural confirmation screens including different information contents, are displayed on the display on a step-by-step basis.

BRIEF DESCRIPTION OF THE DRAWINGS

Exemplary embodiments of the present invention will be described in detail based on the following figures, wherein:

FIG. 9 is a diagram illustrating an example of a private print screen;

DETAILED DESCRIPTION

Exemplary embodiments of the present invention will be described in detail with reference to drawings.

Figure 1:
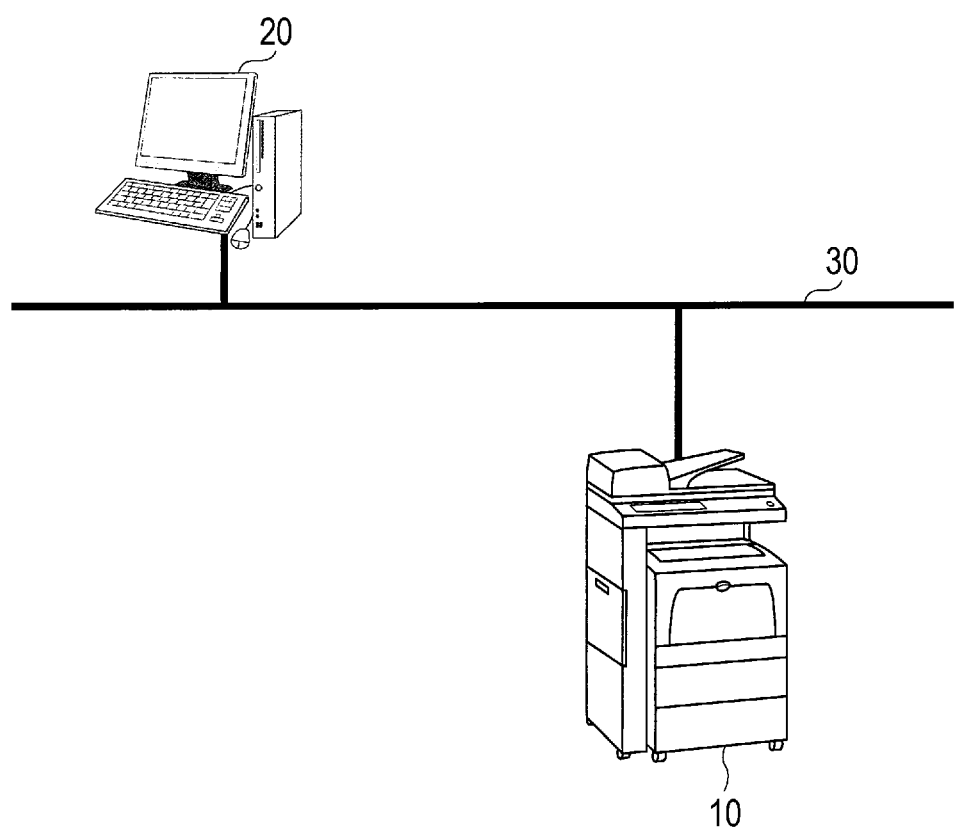
FIG. 1 is a diagram illustrating a configuration of an image forming system according to an exemplary embodiment of the present invention.

FIG. 1 is a diagram illustrating a configuration of an image forming system according to an exemplary embodiment of the present invention.

As illustrated in FIG. 1, an image forming system according to an exemplary embodiment of the present invention includes an image forming apparatus 10 and a terminal apparatus 20 that are connected to each other via a network 30. The terminal apparatus 20 generates print data and transmits the generated print data to the image forming apparatus 10 via the network 30. The image forming apparatus 10 receives the print data transmitted from the terminal apparatus 20 and outputs an image corresponding to the print data on paper. The image forming apparatus 10 is a so-called multifunction apparatus provided with plural functions including a print function, a scan function, a copy function, a facsimile function, and the like.

Figure 2:
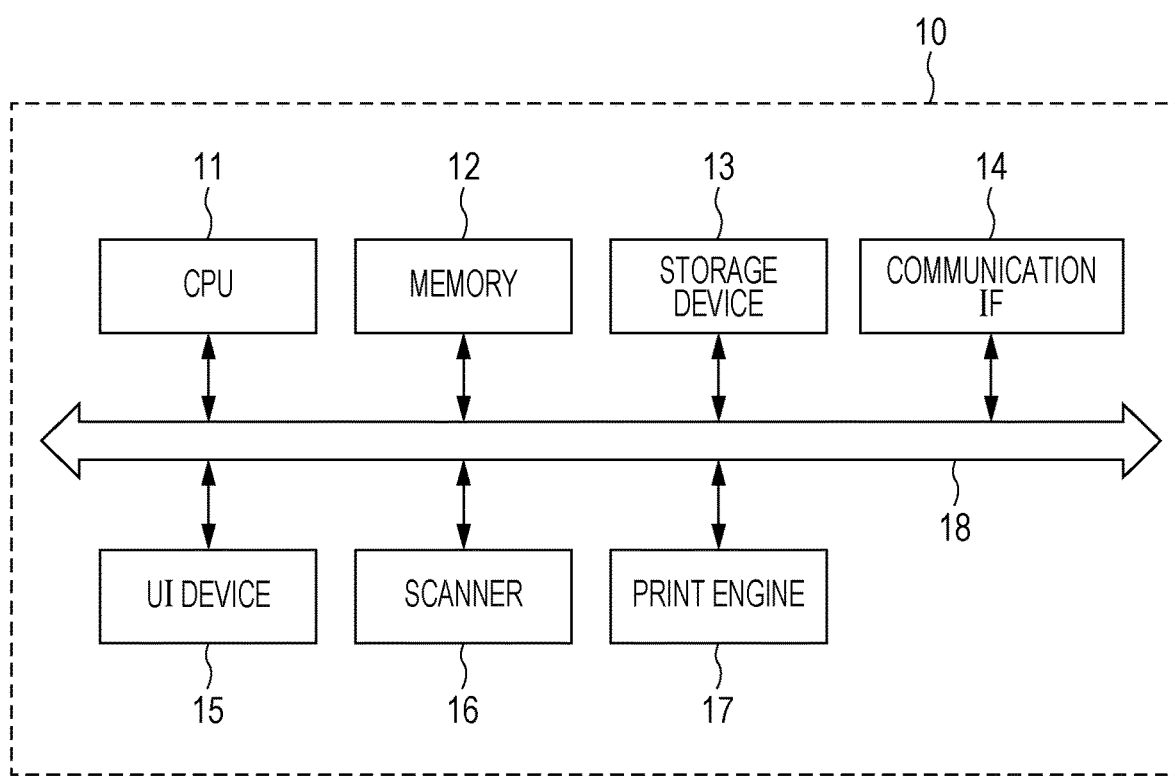
FIG. 2 is a block diagram illustrating a hardware configuration of an image forming apparatus according to an exemplary embodiment of the present invention.

FIG. 2 illustrates a hardware configuration of the image forming apparatus 10 in an image forming system according to an exemplary embodiment.

As illustrated in FIG. 2, the image forming apparatus 10 includes a central processing unit (CPU) 11, a memory 12, a storage device 13 such as a hard disk drive (HDD), a communication interface (IF) 14 that performs transmission and reception of data to and from an external apparatus via the network 30, a user interface (UI) device 15 that includes a touch panel or a liquid crystal display and a keyboard, a scanner 16, and a print engine 17. These components are connected to one another via a control bus 18.

The print engine 17 prints images on a recording medium such as printing paper after processes including charging, exposure, development, transfer, fixation, and the like.

The CPU 11 performs predetermined processing based on a control program stored in the memory 12 or the storage device 13 to control an operation of the image forming apparatus 10. In this exemplary embodiment, the CPU 11 is described as a unit that reads and executes a control program stored in the memory 12 or the storage device 13. However, the program may be stored in a memory medium such as a compact disc-read only memory (CD-ROM) and supplied to the CPU 11.

Figure 3:
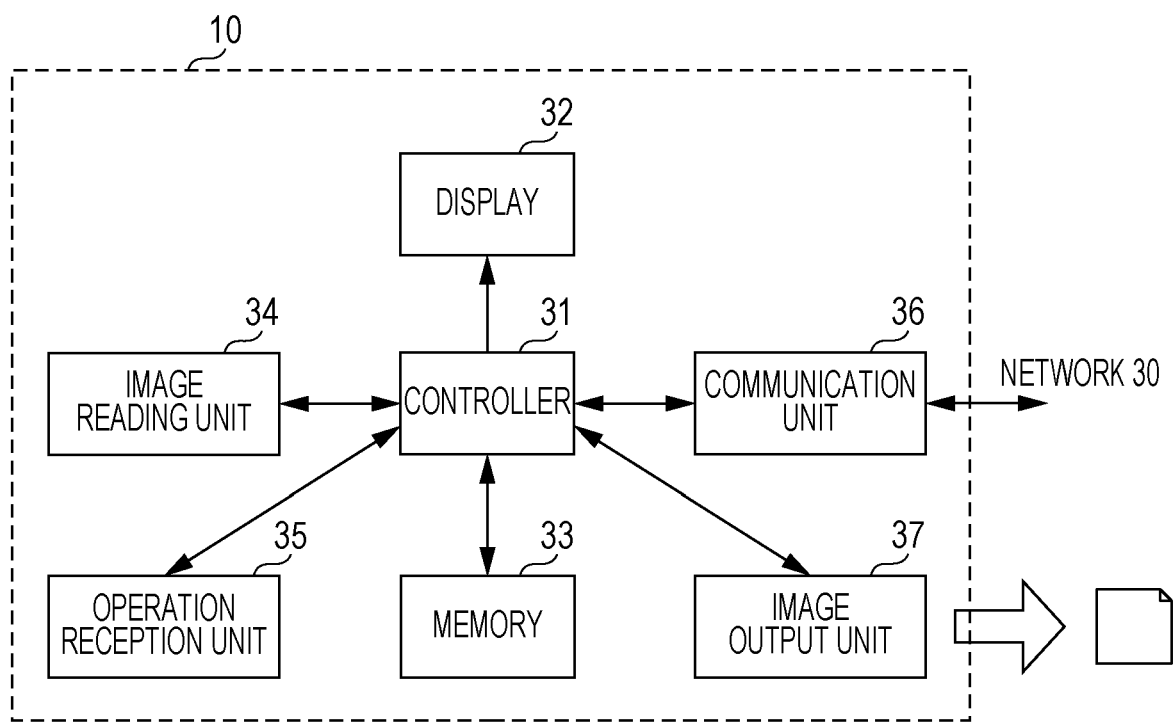
FIG. 3 is a block diagram illustrating a functional configuration of an image forming apparatus according to an exemplary embodiment of the present invention.

FIG. 3 is a block diagram illustrating a functional configuration of the image forming apparatus 10 that is implemented when the above-mentioned control program is executed.

The image forming apparatus 10 according to an exemplary embodiment includes, as illustrated in FIG. 3, a controller 31, a display 32, a memory 33, an image reading unit 34, an operation reception unit 35, a communication unit 36, and an image output unit 37.

The display 32 is a display such as a liquid crystal panel and is configured to be capable of displaying plural icons corresponding to various application programs (hereinafter, abbreviated as applications) on a screen. An icon represents a screen display element that is displayed on a screen, such as a picture and figure indicating an operation position to start a specific application or function, transition to a specific screen, or the like. Screen display elements other than icons include a widget, a shortcut, and the like. The picture and figure may include not only a designed figure but also various characters such as alphabet, hiragana, katakana, and Chinese characters.

The operation reception unit 35 receives various operations for the image forming apparatus 10 performed by a user. In this exemplary embodiment, the operation reception unit 35 receives a collective deletion instruction which is an instruction for collectively deleting plural icons displayed on the display 32.

In this exemplary embodiment, the display 32 and the operation reception unit 35 that are described above form a touch panel.

The memory 33 is a memory that temporality stores image data and the like in the process of processing by the controller 31. The image reading unit 34 performs processing for reading a set document and converting the read document into image data.

The communication unit 36 performs transmission and reception of data to and from an external device such as the terminal apparatus 20. The communication unit 36 performs reception of a print job from the terminal apparatus 20, transmission of image data to a facsimile machine, transmission and reception of e-mails, and the like.

The image output unit 37 performs an operation based on an instruction by the controller 31 and performs processing for printing and outputting image data onto a recording medium such as printing paper.

The controller 31 controls the display 32, the memory 33, the image reading unit 34, the operation reception unit 35, the communication unit 36, the image output unit 37, and the like and performs various types of processing including printing processing, copying processing, processing for reading a document image, and the like.

When the operation reception unit 35 receives a collective deletion instruction, in the case where plural icons for which the collective deletion instruction is issued satisfy a predetermined condition, the controller 31 performs control such that plural confirmation screens having different information contents for confirming whether or not the deletion is to be made are displayed on the display 32 on a step-by-step basis.

Specifically, when the operation reception unit 35 receives a collective deletion instruction, in the case where plural icons for which the collective deletion instruction is issued satisfy a predetermined condition, the controller 31 first displays a confirmation screen which urges general precautions on the display 32 and then displays a confirmation screen which urges detailed precautions on the display 32, on a step-by-step basis.

For example, the controller 31 displays a confirmation screen (first confirmation screen) for indicating general precautions for a case where a collective deletion instruction for plural icons is issued and then confirming whether or not the deletion is to be made and a confirmation screen (second confirmation screen) for indicating a problem which will occur when an icon included in the plural icons for which the collective deletion instruction is issued is deleted and then confirming whether or not the deletion is to be made, on the display 32 on a step-by-step basis.

More specifically, the controller 31 displays, as a confirmation screen for indicating general precautions and then confirming whether or not deletion is to be made, a confirmation screen for notifying that a problem will occur when a single-touch application icon or an icon whose specific function will become invalid when the icon is deleted is included in plural icons to be collectively deleted and then confirming whether or not the deletion is to be made, on the display 32.

A single-touch application icon represents an icon for executing a single-touch application whose function is customized for each user such that setting contents often used by the user is registered in advance for a basic application regarding copy, printing, scanning, or the like, that is, an icon for executing processing for contents set in advance by a user.

Furthermore, the controller 31 may display plural confirmation screens having different information contents for similar information groups on the display 32 on a step-by-step basis.

For example, the controller 31 may display, for each type of problem occurring by deletion of an icon, plural confirmation screens for indicating a reason for occurrence of the problem and then confirming whether or not the deletion is to be made, on the display 32 on a step-by-step basis.

Specifically, as plural confirmation screens for indicating, for each type of problem occurring by deletion of an icon, a reason for the occurrence of the problem and then confirming whether or not the deletion is to be made, plural confirmation screens among a confirmation screen for indicating that it will take time to recreate an icon to recover the deleted icon, a confirmation screen for indicating that deletion of the icon will affect other users, and a confirmation screen for indicating that a valid specific function will be invalidated by deletion of the icon, on the display 32 on a step-by-step basis.

Specific examples of a collective deletion instruction received by the operation reception unit 35 include an instruction for deleting a page in which plural icons are arranged.

In the case where an instruction for deleting a page in which plural icons are arranged is issued, the controller 31 may perform processing in response to an instruction for collectively deleting all the icons arranged in the same layer of the page or may perform processing in response to an instruction for collectively deleting only icons that are visible on the screen among all the icons arranged in the same layer.

Furthermore, specific examples of a collective deletion instruction received by the operation reception unit 35 include an instruction for deleting a folder including plural icons.

In the case where all the icons for which a collective deletion instruction is issued are icons in which no problem occurs even when the icons are deleted, the controller 31 may perform control such that a confirmation screen for confirming whether or not the deletion is to be made is displayed only once on the display 32 or such a confirmation screen is not displayed.

An icon in which no problem occurs even when the icon is deleted represents an icon (basic icon) corresponding to a basic function that is prepared in advance. A basic icon represents an icon corresponding to an application that is installed in advance in an apparatus.

An operation of the image forming apparatus 10 according to an exemplary embodiment will be described in detail with reference to drawings.

In the image forming apparatus 10 according to an exemplary embodiment, the display 32 and the operation reception unit 35 that are described above form a touch panel 40. An example of display contents of the touch panel 40 of the image forming apparatus 10 according to an exemplary embodiment is illustrated in FIG. 4.

Figure 4:
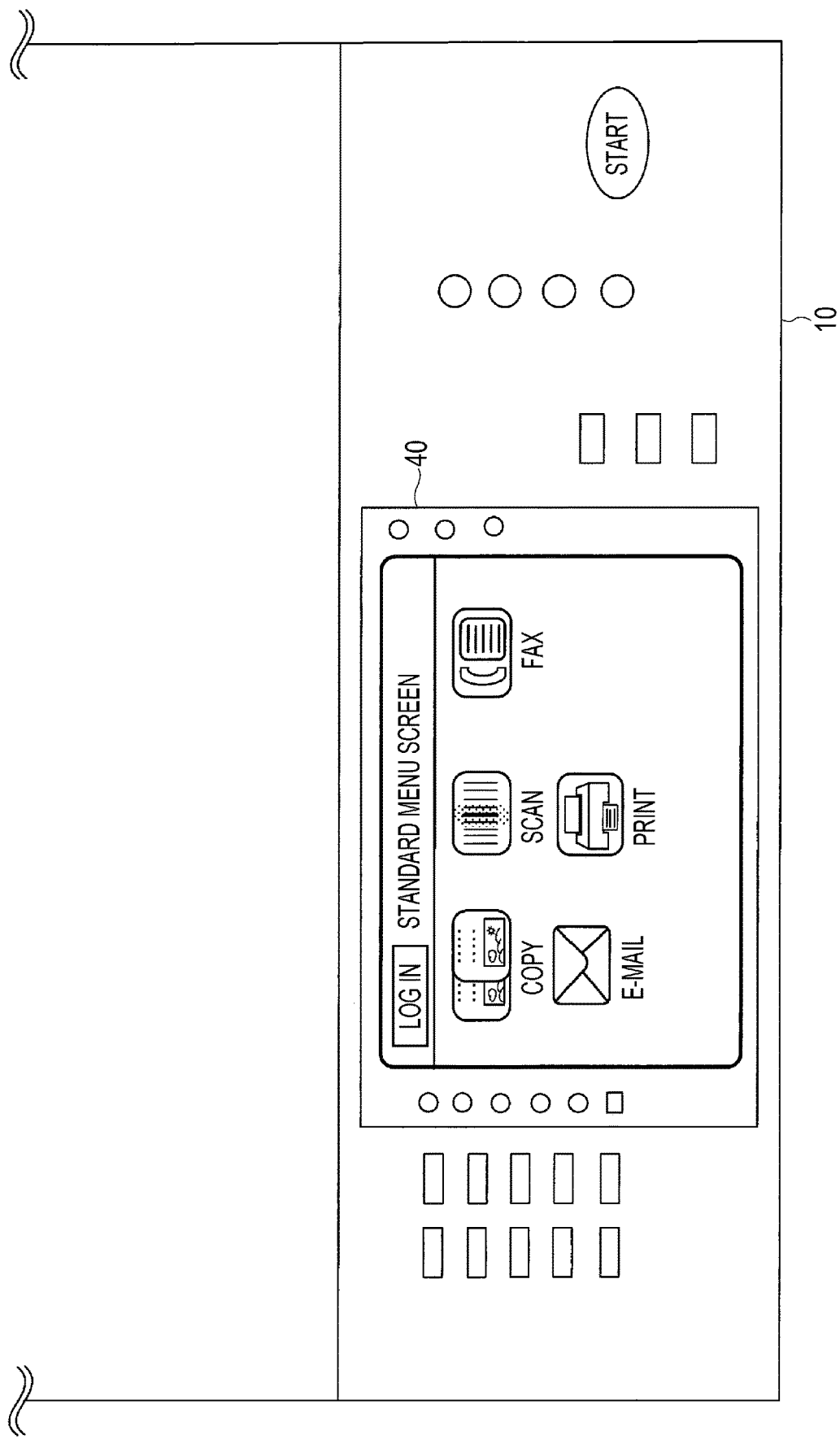
FIG. 4 is a diagram illustrating an example of a standard menu screen displayed on a touch panel of an image forming apparatus.
Figure 5:
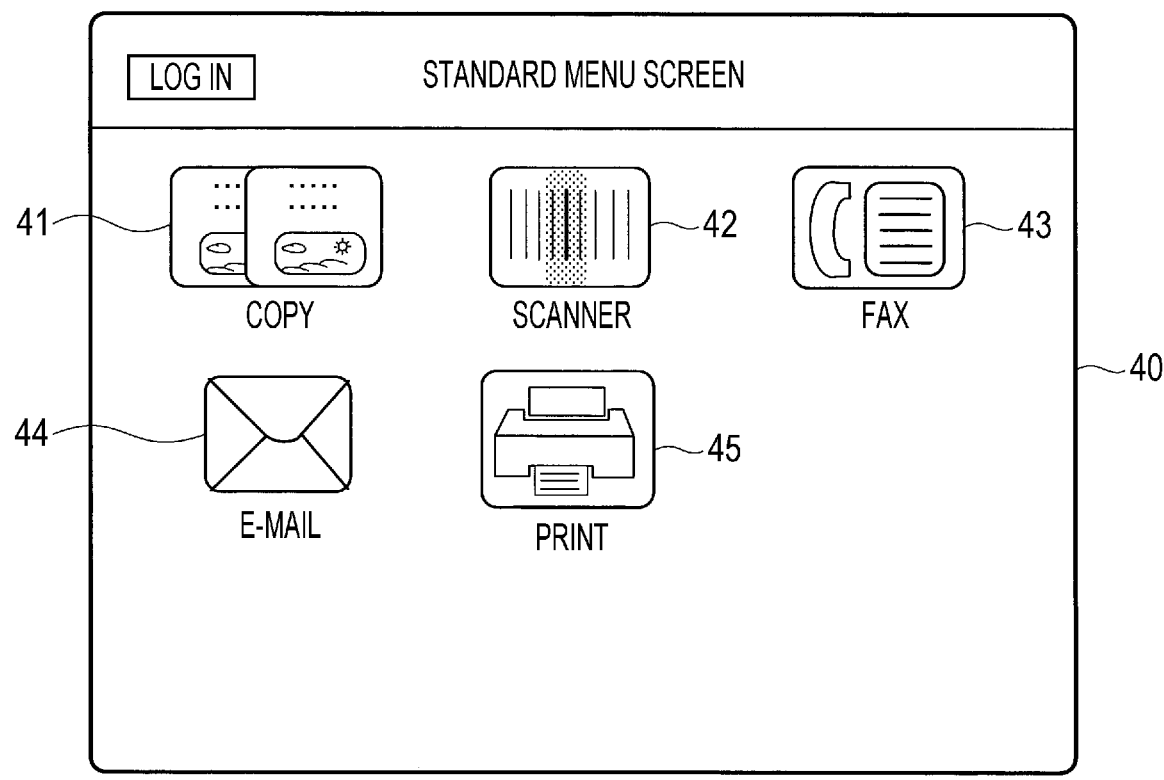
FIG. 5 is a diagram illustrating enlarged display contents of the standard menu screen illustrated in FIG. 4.

FIG. 4 is a diagram illustrating an example of a standard menu screen displayed on the touch panel 40 of the image forming apparatus 10. FIG. 5 illustrates enlarged display contents of the standard menu screen.

In the example of the standard menu screen illustrated in FIG. 5, icons 41 to 45 for selecting execution of functions are displayed on the touch panel 40.

For example, the icon 41 is an icon for selecting execution of a copy function. When a user touches with a finger and selects the icon 41, a copy application program is activated, and the user is enabled to use the copy function. In a similar manner, the icons 42 to 45 are basic icons for executing a scan function, a facsimile function, an e-mail transmission and reception function, and an apparatus setting function, respectively.

The above-mentioned standard menu screen is shared among plural users. Therefore, custom menu screens that may be customized and used by individual users are prepared for the users.

Each user is able to perform transition to a custom menu screen for the user by logging in or being authenticated on the standard menu screen illustrated in FIG. 5.

Figure 6:
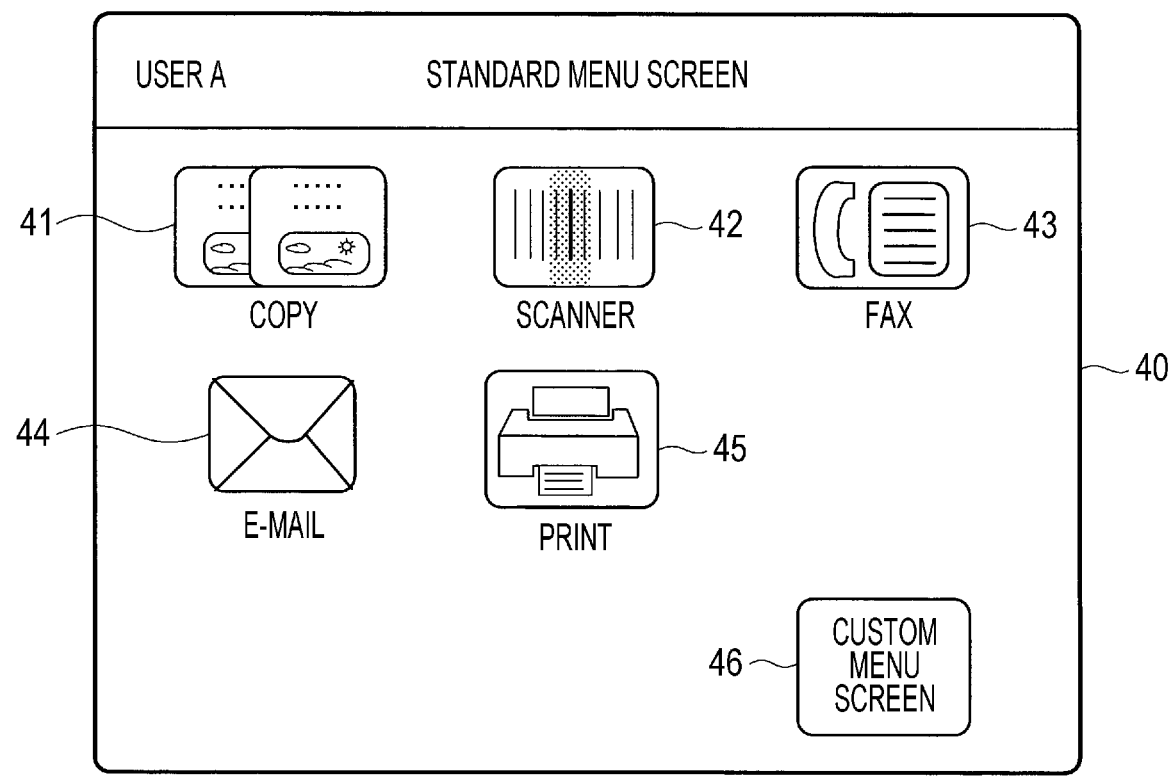
FIG. 6 is a diagram illustrating a state after a user A logs in on a standard menu screen.

FIG. 6 illustrates a state of the standard menu screen after a user A logs in. In the example of the screen illustrated in FIG. 6, a custom menu screen button 46 is displayed, and the user A is able to perform transition to a custom menu screen by touching the custom menu screen button 46.

Figure 7:
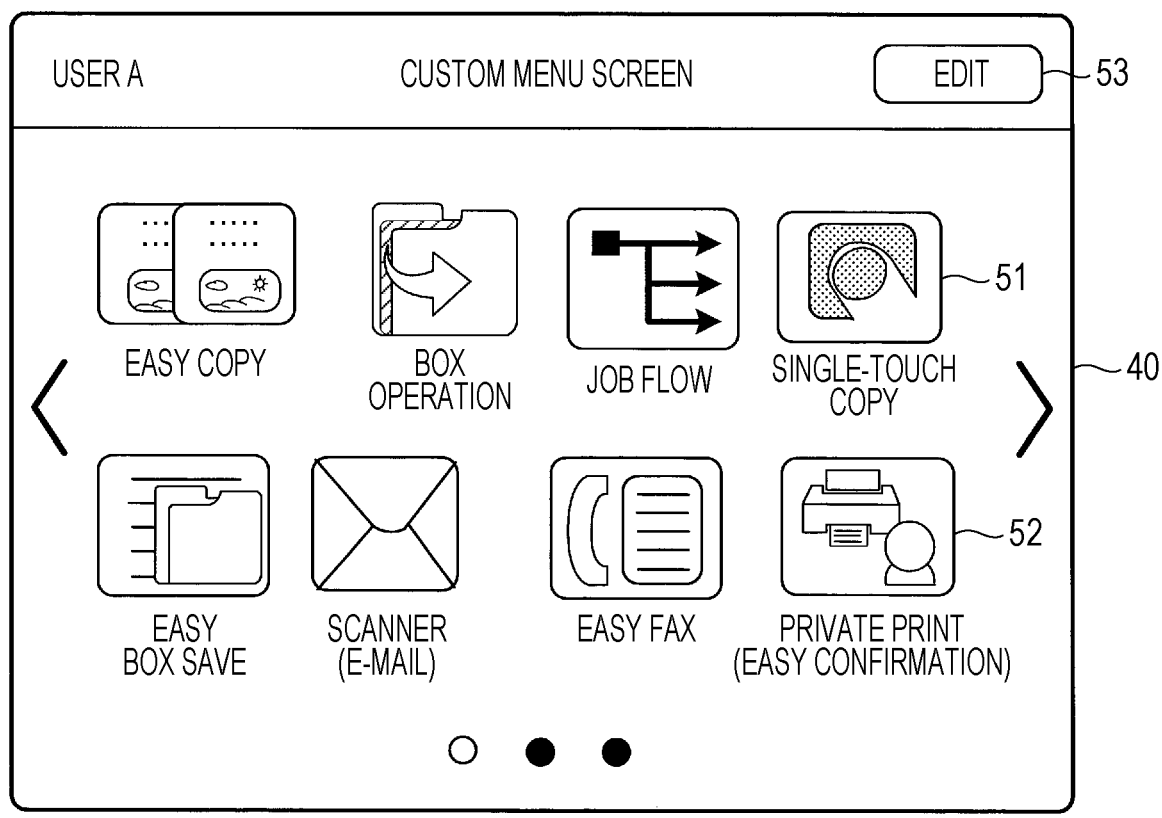
FIG. 7 is a diagram illustrating an example of a custom menu screen for the user A.

FIG. 7 illustrates an example of a custom menu screen for the user A displayed by the operation described above. In the example of the custom menu screen, arrangement positions of icons may be changed, a new basic icon may be added, and a created single-touch application icon may be arranged so that each user is able to use the custom menu screen easily.

Figure 8:
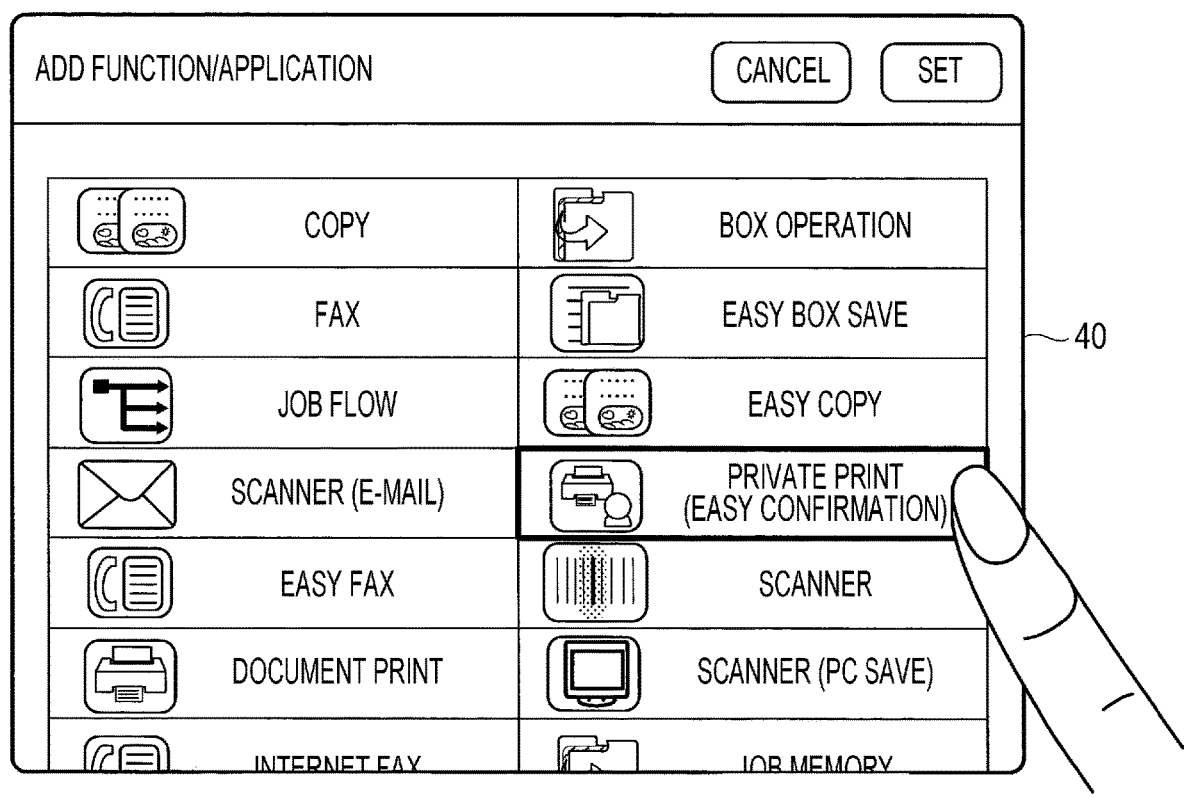
FIG. 8 is a diagram illustrating an example of an operation for adding a basic icon on a custom menu screen.

FIG. 8 illustrates an example of an operation for adding a basic icon on a custom menu screen.

For example, by selecting an icon to be added to a custom menu screen from the basic icon addition screen illustrated in FIG. 8, the selected icon may be added to the custom menu screen. In FIG. 8, an example of an operation for adding a basic icon "private print (easy confirmation)" is illustrated.

In the example of the custom menu screen illustrated in FIG. 7, in addition to various basic icons, a single-touch application icon 51 and a private print icon 52 are arranged.

The private print icon 52 is one of the plural basic icons described above and is an icon for transition to a private print screen.

FIG. 9 illustrates an example of a private print screen obtained when the user A touches the private print icon 52.

Private print represents accumulation print in which the terminal apparatus 20 first stores a transmitted print job (print instruction) and then performs printing processing in response to an output instruction issued by a user.

On the private print screen illustrated in FIG. 9, a list of print jobs transmitted from the user A is displayed. The user A is able to select only a print job for which the user A wants to perform printing processing from the displayed list and issue an instruction for performing printing processing. In the example of the private print screen illustrated in FIG. 9, a state in which document data "invoice for month A" and "detailed statement list" are selected is illustrated.

As described above, the user A arranges the private print icon 52 on the custom menu screen, so that transition to the private print screen described above may be achieved with a single touch.

Furthermore, in the image forming apparatus 10 according to this exemplary embodiment, a private print screen direct display function is provided. In a state in which the private print screen direct display function is valid, in the case where the private print icon 52 is arranged in a certain position on a custom menu screen and a print job from a user is stored, when an instruction for transition to the custom menu screen from the standard menu screen is issued, transition to the private print screen is directly achieved by skipping display of the custom menu screen.

The private print screen direct display function will be explained below with reference to FIG. 10.

Figure 10:
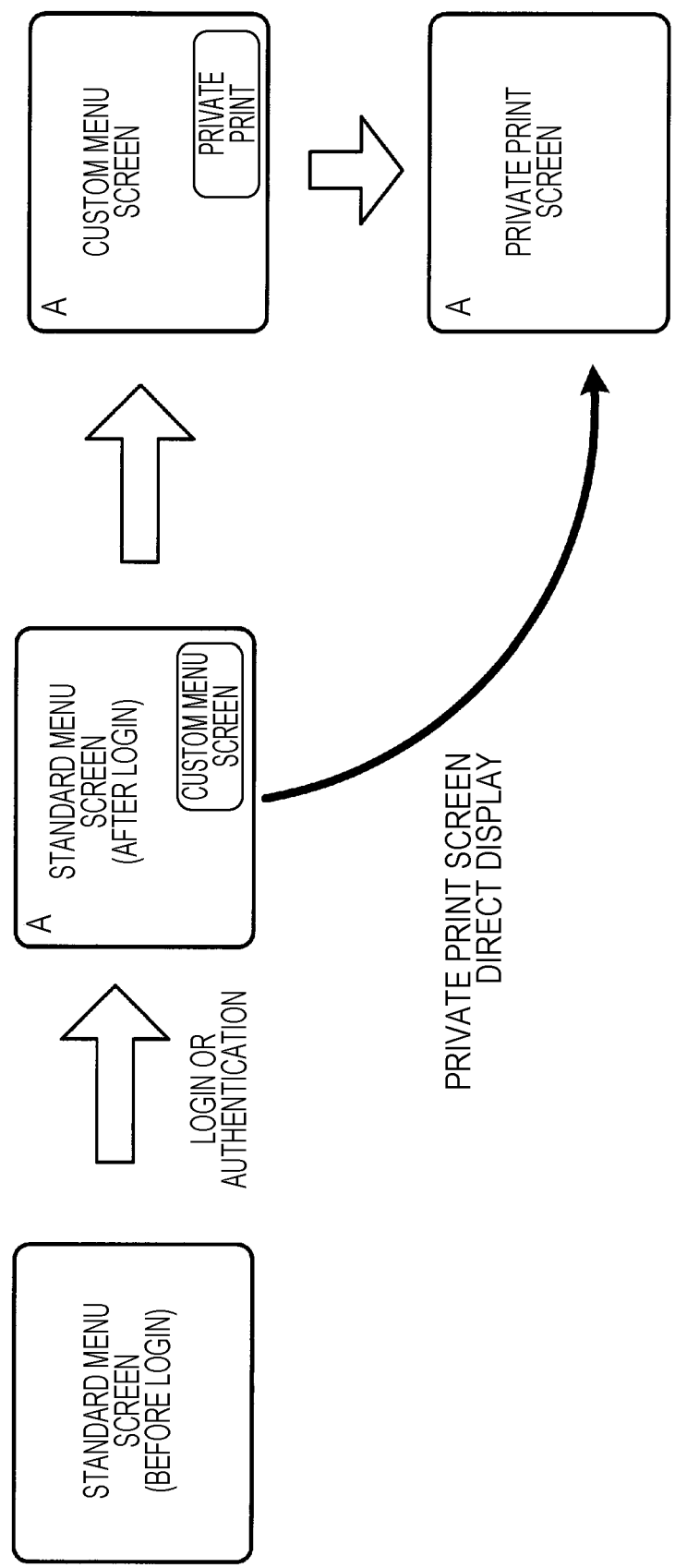
FIG. 10 is a diagram for explaining a private print screen direct display function.

In a state in which the above condition is satisfied, as illustrated in FIG. 10, in the case where the user A logs in or is authenticated on the standard menu screen, when the custom menu screen button is operated, the private menu screen is directly displayed, instead of displaying the custom menu screen for the user A and then displaying the private menu screen.

By preparing and validating a function to directly display a custom menu screen for a user in the case where the user logs in or authentication is successful on the standard menu screen and combining the function with the above-mentioned private print screen direct display function, when login or authentication is successful on the standard menu screen, processing for directly displaying the private print screen for the user may be achieved.

Next, an example of an operation for editing such a custom menu screen will be explained. In the example of the custom menu screen illustrated in FIG. 7, for example, by touching an edit button 53, transition to an edit screen illustrated in FIG. 11 is performed.

Figure 11:
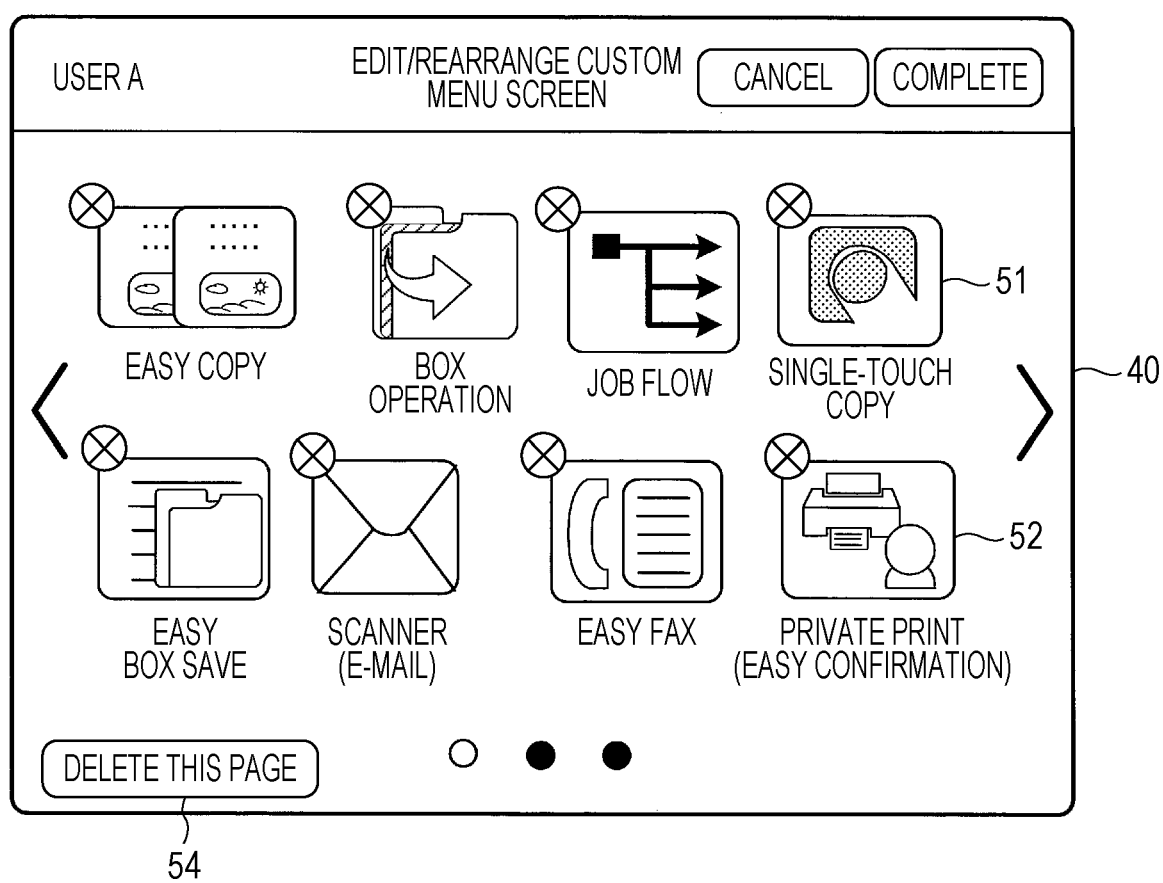
FIG. 11 is a diagram illustrating an example of an edit screen of a custom menu screen.

In the example of the edit screen illustrated in FIG. 11, each icon arranged on the screen may be selected and deleted. Furthermore, by touching a page deletion button 54 indicating "delete this page", all the icons arranged in this page may be collectively deleted.

That is, by touching the page deletion button 54, all the eight icons displayed on the screen may be collectively deleted.

Figure 12:
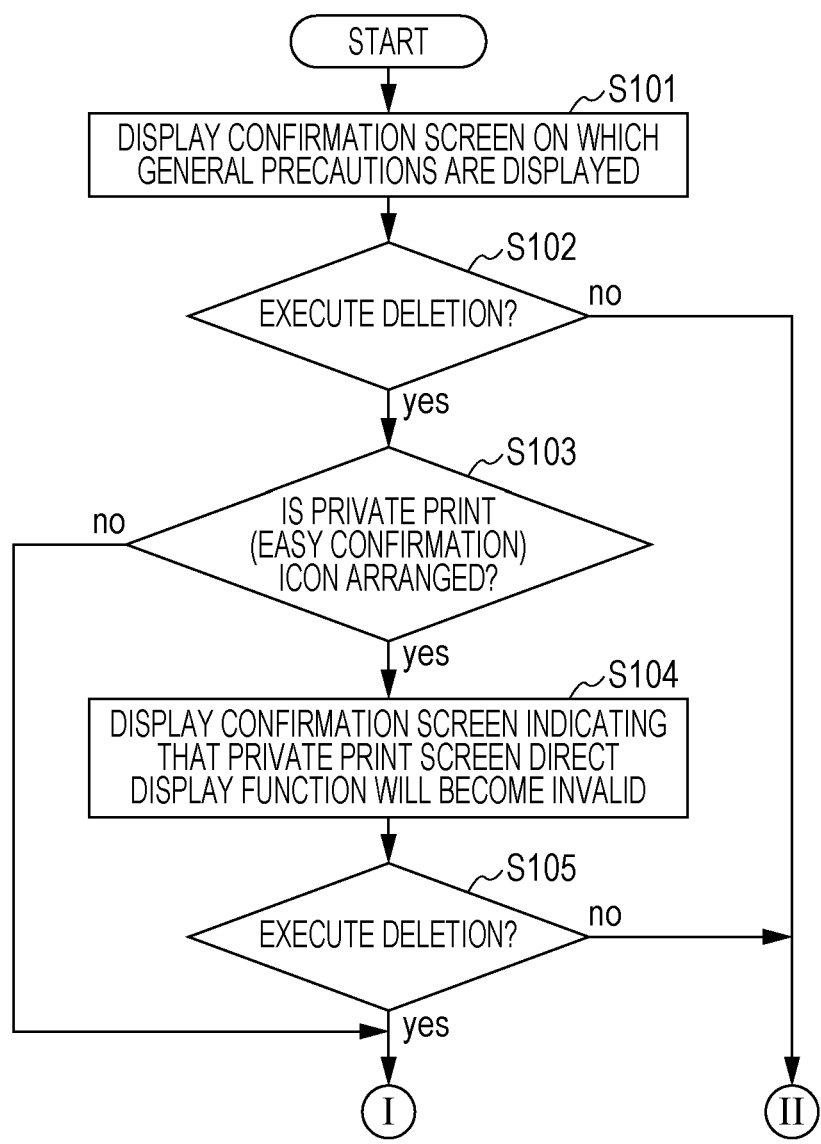
FIG. 12 is a flowchart for explaining an operation of an image forming apparatus when a page deletion button is touched (pressed)
Figure 13:
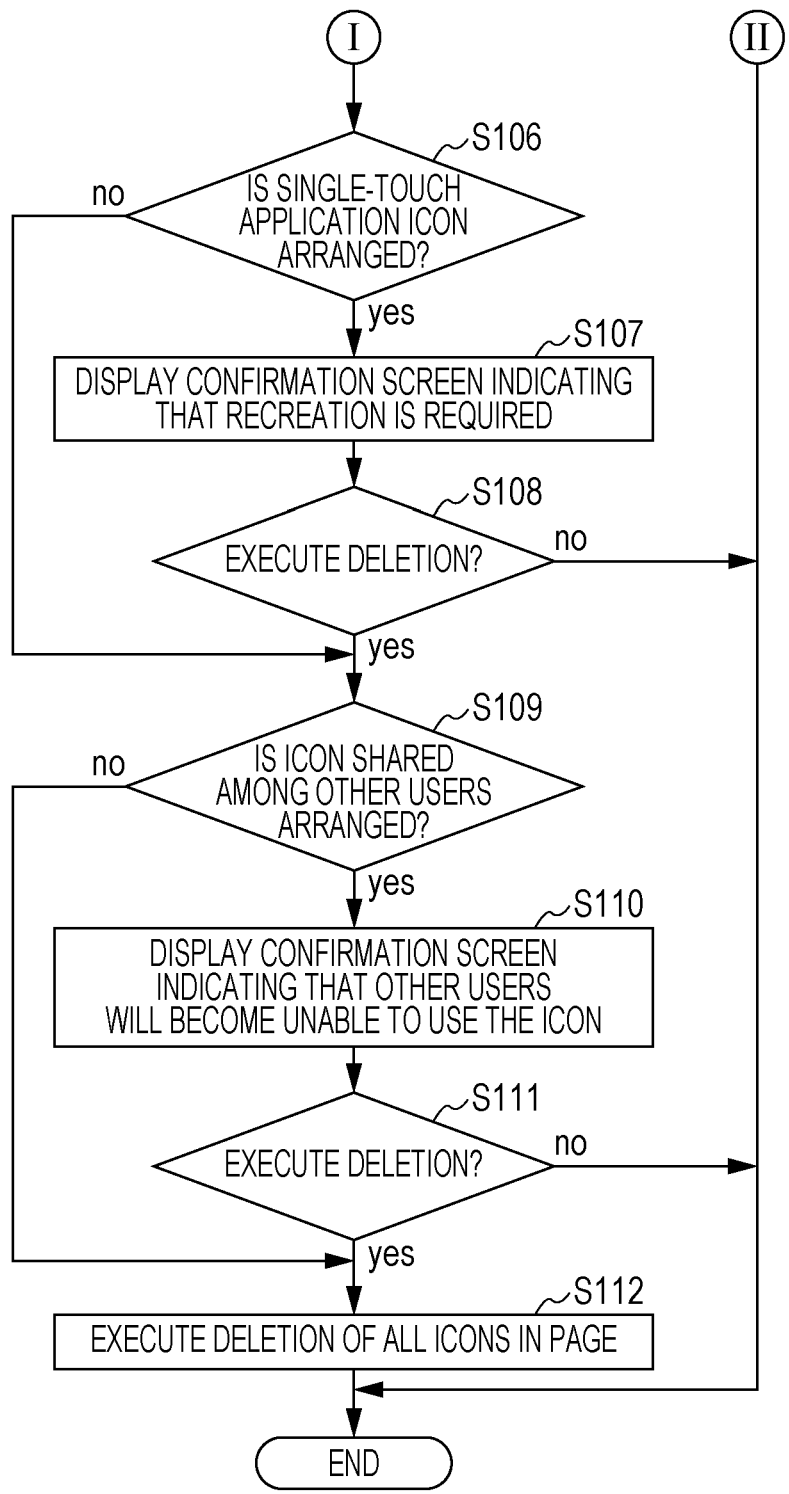
FIG. 13 is a flowchart for explaining an operation of an image forming apparatus when a page deletion button is touched (pressed)

Next, an operation of the image forming apparatus 10 for the case where the page deletion button 54 is touched (pressed) will be explained with reference to flowcharts of FIGS. 12 and 13.

Figure 14:
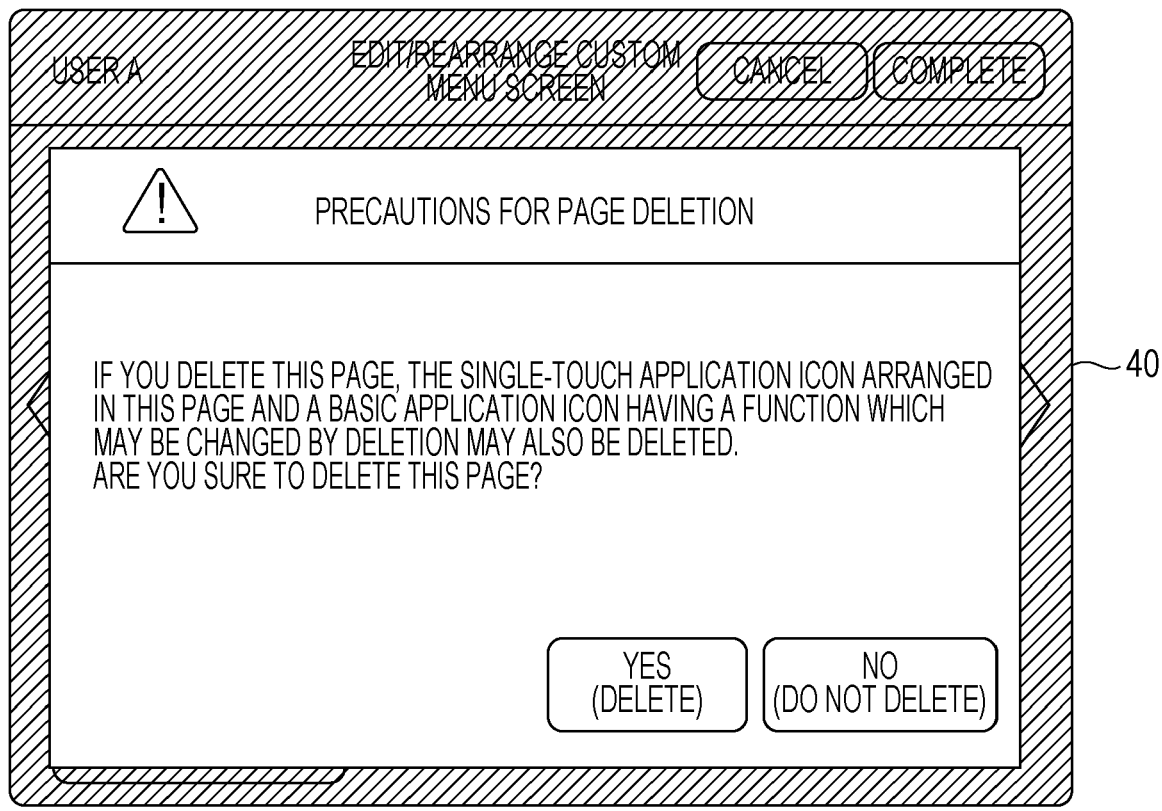
FIG. 14 is a diagram illustrating an example of a confirmation screen on which general precautions are indicated.

First, when the page deletion button 54 is touched, a confirmation screen (first confirmation screen) for indicating general precautions for the case where an instruction for collectively deleting plural icons is issued and then confirming whether or not the deletion is to be made is displayed on the touch panel 40 (step S101). FIG. 14 illustrates an example of such a confirmation screen indicating general precautions.

The confirmation screen example in FIG. 14 illustrates a case where a confirmation screen including information contents, "If you delete this page, the single-touch application icon arranged in this page and a basic application icon having a function which may be changed by deletion may also be deleted. Are you sure to delete this page?", is pop-up displayed.

The user who views the confirmation screen including such information contents is able to understand that the single-touch application icon and the basic application icon having a function which may be changed will also be deleted.

When the user selects "delete" on the confirmation screen illustrated in FIG. 14 to issue an instruction for execution of deletion (Yes in step S102), the controller 31 determines whether or not a "private print (easy confirmation)" icon is arranged in the page that is to be deleted (step S103).

Figure 15:
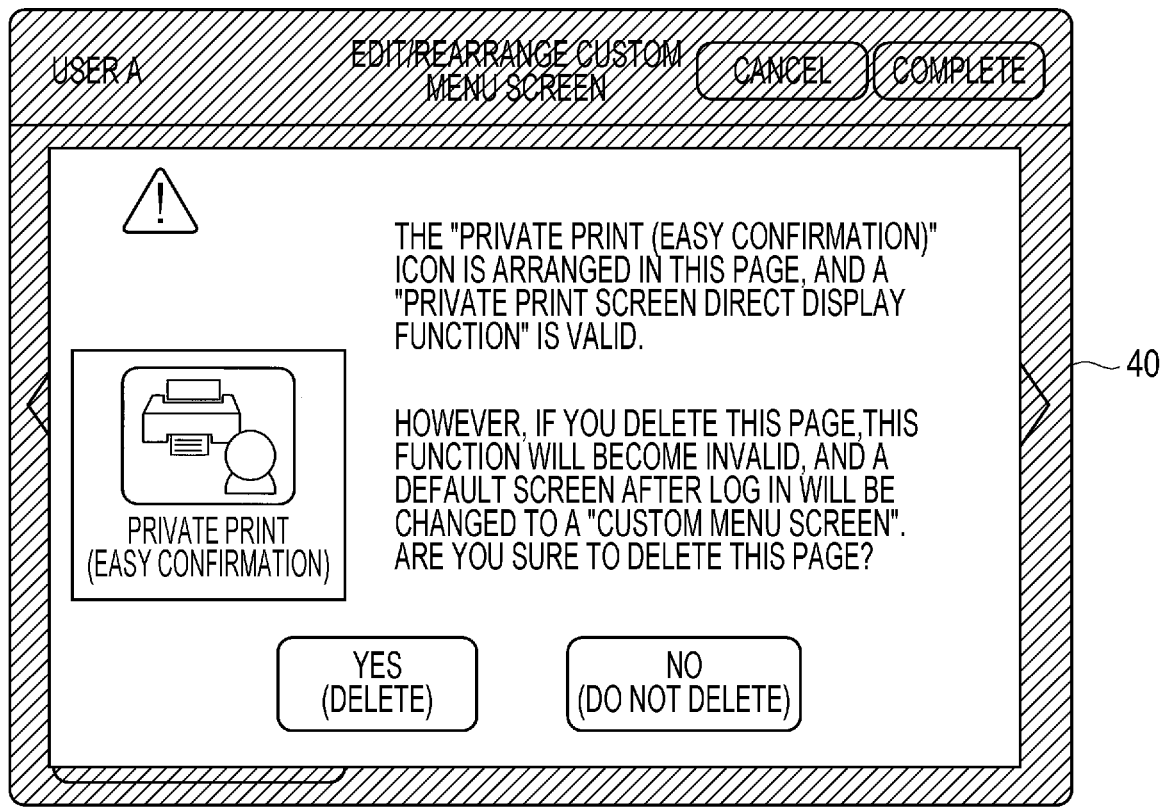
FIG. 15 is a diagram illustrating a confirmation screen example 1 indicating that a private print screen direct display function will become invalid.

In the case where the "private print (easy confirmation)" icon is arranged in the page to be deleted (Yes in step S103), the controller 31 displays a confirmation screen for providing notification indicating that deletion of the icon will cause a problem and then confirming whether or not the deletion is to be made on the touch panel 40 (step S104). Specifically, a confirmation screen (second confirmation screen) indicating that a private print screen direct display function will become invalid is displayed. FIG. 15 illustrates a confirmation screen example 1.

The confirmation screen example 1 in FIG. 15 illustrates a case where a confirmation screen including information contents, "The 'private print (easy confirmation)' icon is arranged in this page, and a 'private print screen direct display function' is valid. However, if you delete this page, this function will become invalid. Are you sure to delete this page?", is pop-up displayed.

When the user selects "delete" on the confirmation screen illustrated in FIG. 15 to issue an instruction for execution of deletion (Yes in step S105), the controller 31 determines whether or not a single-touch application icon is arranged in the page that is to be deleted (step S106).

Figure 16:
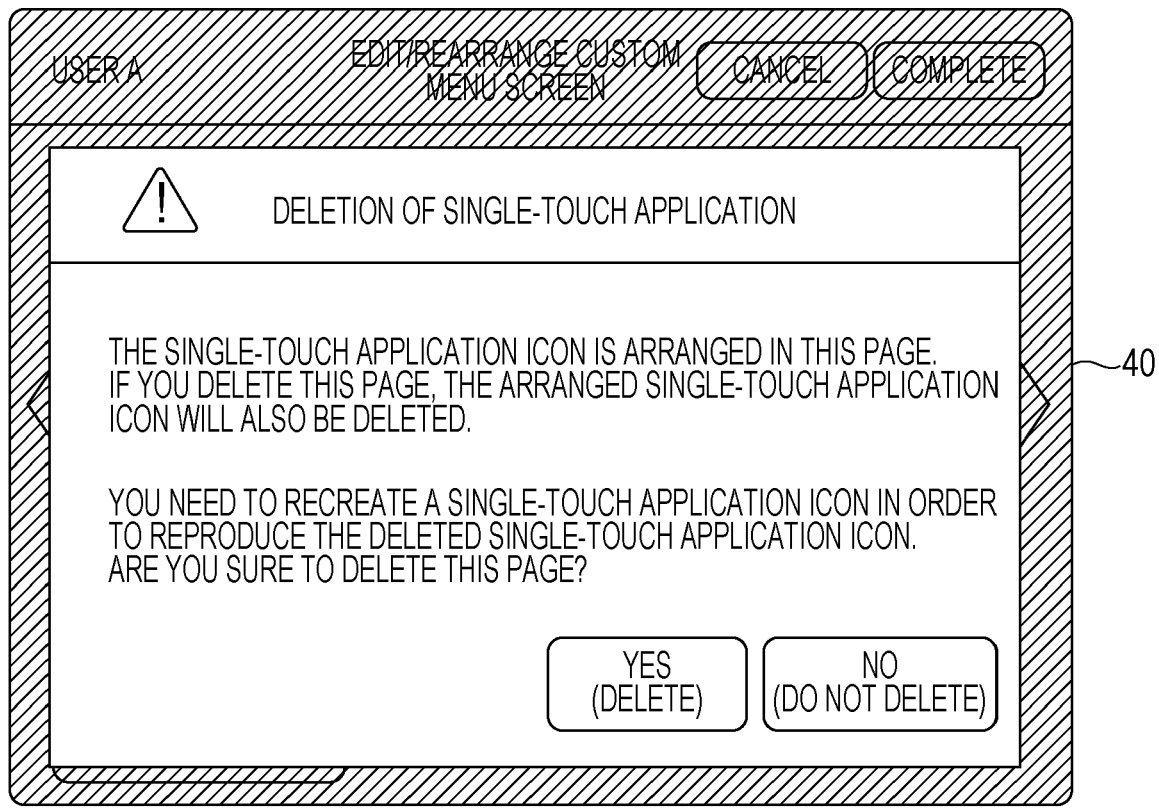
FIG. 16 is a diagram illustrating a confirmation screen example 2 indicating that a single-touch application icon needs to be recreated to recover a deleted single-touch application icon.

In the case where the single-touch application icon is arranged in the page that is to be deleted (Yes in step S106), the controller 31 displays a confirmation screen for providing notification indicating that deletion of the icon will cause a problem and then confirming whether or not the deletion is to be made on the touch panel 40 (step S107). Specifically, a confirmation screen (second confirmation screen) indicating that recreation of a single-touch application icon is required to recover a deleted single-touch application icon is displayed. FIG. 16 illustrates a confirmation screen example 2.

The confirmation screen example 2 in FIG. 16 illustrates a case where a confirmation screen including information contents, "The single-touch application icon is arranged in this page. If you delete this page, the arranged single-touch application icon will also be deleted. You need to recreate a single-touch application icon in order to recover the deleted single-touch application icon. Are you sure to delete this page?", is pop-up displayed.

When the user selects "delete" on the confirmation screen illustrated in FIG. 16 to issue an instruction for execution of deletion (Yes in step S108), the controller 31 determines whether or not an icon shared among other users is arranged in the page that is to be deleted (step S109).

Figure 17:
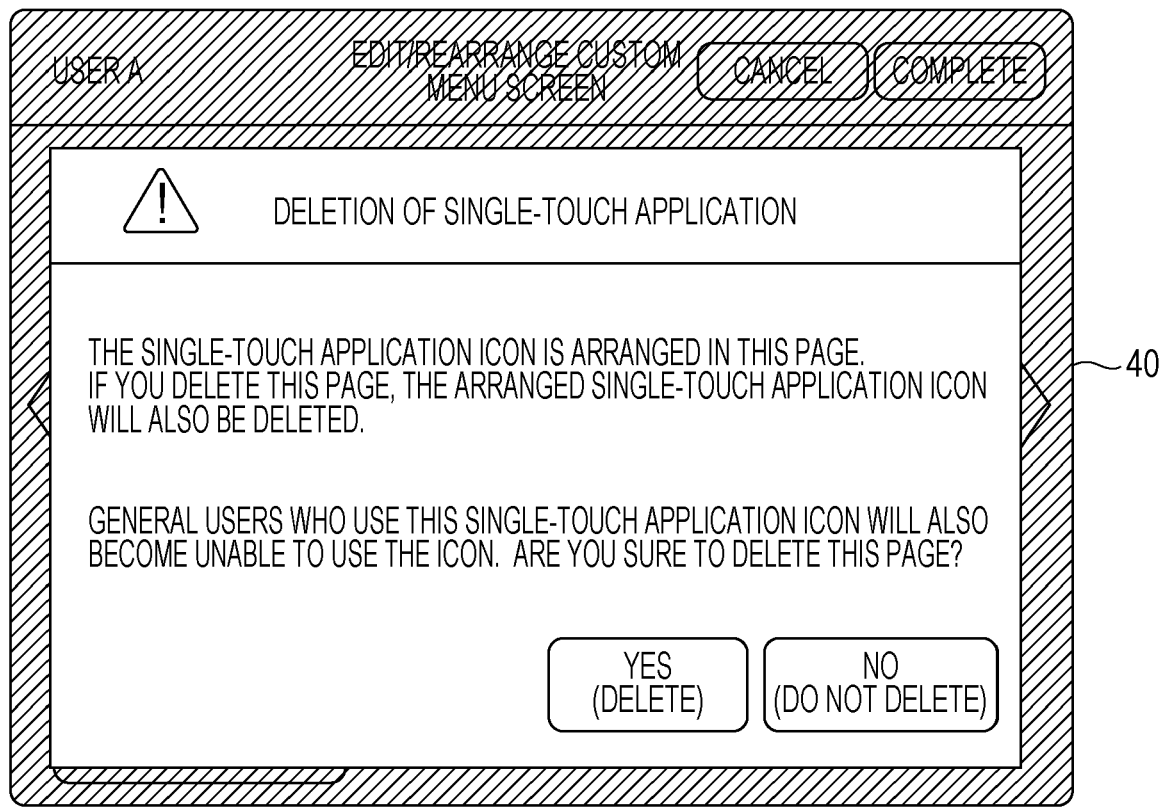
FIG. 17 is a diagram illustrating a confirmation screen example 3 indicating that other users will be unable to use a single-touch application icon if the icon is deleted.

In the case where an icon shared among other users is arranged in the page that is to be deleted (Yes in step S109), the controller 31 displays a confirmation screen for providing notification indicating that deletion of the icon will cause a problem and then confirming whether or not the deletion is to be made on the touch panel 40 (step S110). Specifically, a confirmation screen (second confirmation screen) indicating that deletion of a single-touch application icon will make other users unable to use the icon is displayed. FIG. 17 illustrates a confirmation screen example 3.

The confirmation screen example in FIG. 17 illustrates a case where a confirmation screen including information contents, "The single-touch application icon is arranged in this page. If you delete this page, the arranged single-touch application icon will also be deleted. General users who use the single-touch application icon will also become unable to use the icon. Are you sure to delete this page?", is pop-up displayed.

In the case where a user who has an administrator authority creates a single-touch application icon, general users are also able to use the created single-touch application icon. Therefore, in the case where the user who has the administrator authority tries to delete the created single-touch application icon, a general user may arrange the created single-touch application icon on a custom menu screen for the user and use the icon without being noticed by the user who has the administrator authority. In such a case, in the case where the user who has the administrator authority tries to delete the single-touch application icon, by displaying the confirmation screen illustrated in FIG. 17, the user who has the administrator authority is notified of a problem that may occur when the single-touch application icon is deleted.

It may be determined whether or not there is a general user who is actually using the single-touch application icon. Only in the case where it is determined that there is a general user who is using the single-touch application icon, the confirmation screen illustrated in FIG. 17 may be displayed.

In the case where the user selects "delete" on the confirmation screen illustrated in FIG. 17 to issue an instruction for execution of deletion (Yes in step S111), the controller 31 deletes all the icons arranged in the page (step S112).

As described above, only in the case where the user selects "delete" on all the plural confirmation screens displayed on a step-by-step basis, processing for deleting all the plural icons arranged in the page for which the collective deletion instruction is issued is performed. In the case where "do not delete" is selected in any one of steps S102, S105, S108, and S111, the process ends without deleting any icon arranged in the page.

In the example described above, a case where plural icons that are displayed on the screen of the touch panel 40 are collectively deleted when the page deletion button 54 is operated has been described. However, depending on the concept of a page, all the icons arranged within the same layer of one page may be collectively deleted.

Figure 18:
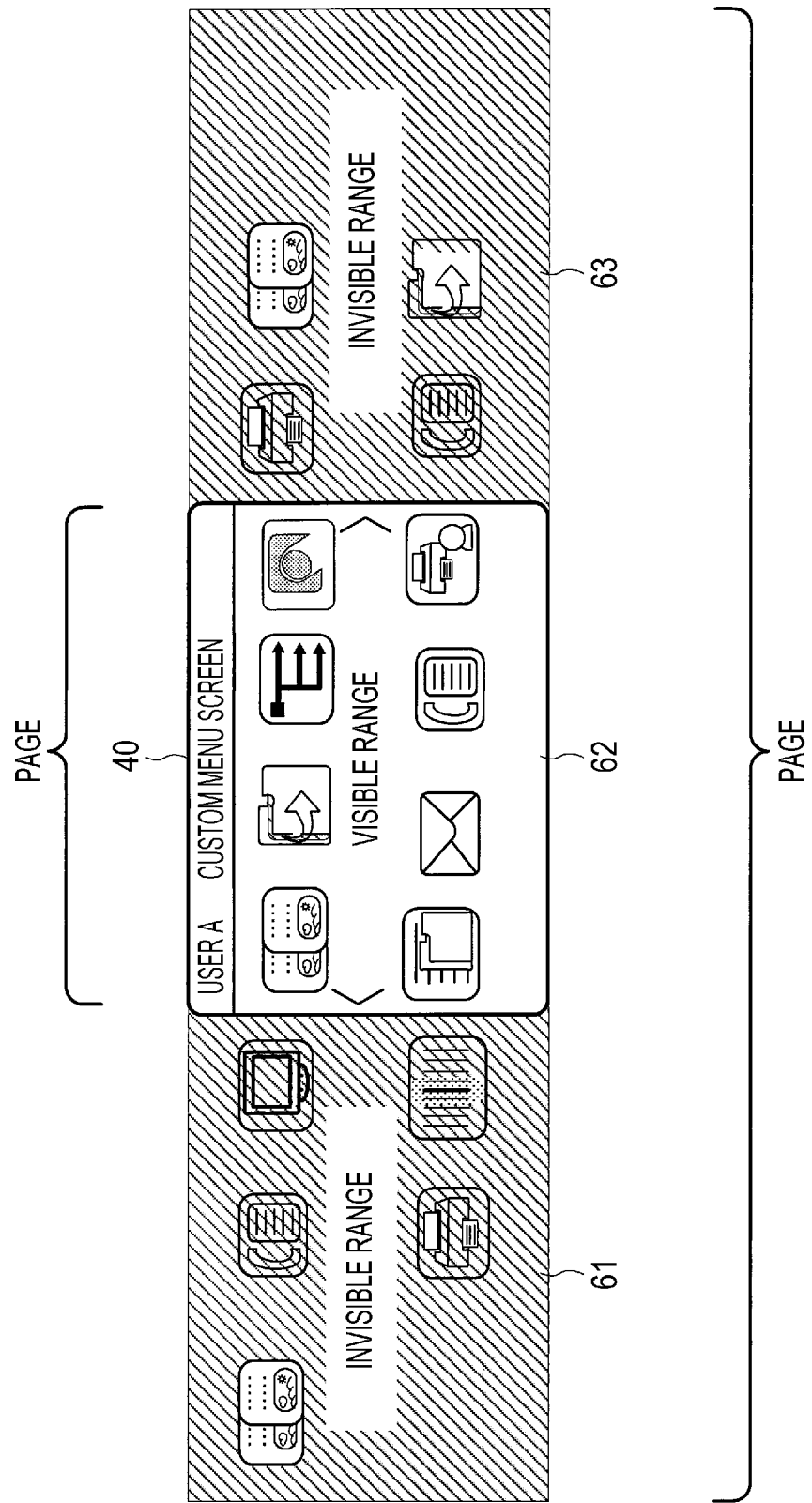
FIG. 18 is a diagram for explaining an example of a concept of a page for a display region of a touch panel.

Specifically, as illustrated in FIG. 18, in the case where icons are arranged in three pages of a custom menu screen, only icons within a visible range 62 on the touch panel 40 may be set as a target of collective deletion, or all the icons arranged within invisible ranges 61 and 63 in the same layer may be regarded as icons in the same page and set as a target of collective deletion.

Furthermore, also in the case where a collective deletion instruction is issued on a screen of the touch panel 40 which may be scrolled, only actually displayed icons within a visible range may be set as a target of collective deletion, or all the icons arranged in an invisible range may be regarded as icons in the same page and set as a target of collective deletion.

In the case where plural pages exist, for collective deletion of plural icons arranged in a page, there are two deletion patterns: deleting the page itself; and leaving the page as a blank page and deleting only arranged icons. However, as processing for a case where only one page exists, the page needs to be maintained as a blank page without deleting the entire page.

Furthermore, in the explanation provided above, a confirmation screen is displayed when a single-touch application icon is included in plural icons to be collectively deleted. However, switching between displaying and not displaying a confirmation screen may be performed in accordance with the past use record of the single-touch application icon. For example, a confirmation screen may not be displayed for a single-touch application icon for which there is no past use record even when the single-touch application icon is a target of collective deletion, and a confirmation screen may be displayed for a single-touch application icon for which there is a use record when the single-touch application icon is a target of collective deletion.

Furthermore, in the explanation provided above, a confirmation screen is displayed when a "private print (easy confirmation)" icon is included in plural icons to be collectively deleted. The confirmation screen is displayed only when the private print screen direct display function is valid. This is because when the private print screen direct display function is invalid, even if the "private print (easy confirmation)" icon is deleted, no functional change occurs and there is no need to display a confirmation screen.

Figure 19:
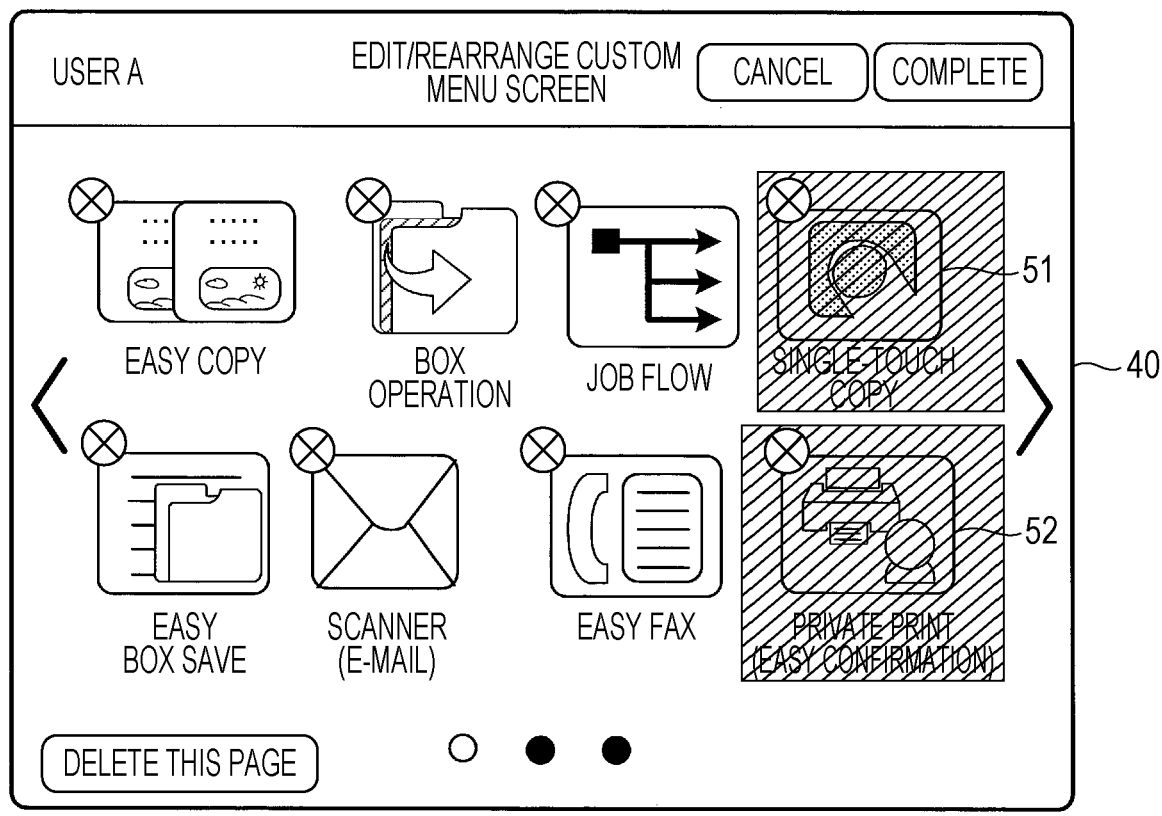
FIG. 19 is a diagram illustrating an example of an edit screen for a case where gray out display is performed.

Instead of displaying a confirmation screen when a user tries to collectively delete the single-touch application icons or the "private print (easy confirmation)" icon as described above, a target of collective deletion may not be set. For example, as illustrated in FIG. 19, when the edit mode of the custom menu screen is entered, the single-touch application icon 51 or the private print icon 52 may be gray-out displayed or the color of the single-touch application icon 51 or the private print icon 52 may be changed such that a user is able to understand that a collective deletion target may not be set. By allowing the single-touch application icon 51 and the private print icon 52 to be deleted separately, false deletion may be avoided, and user-friendliness is not particularly hampered.

Figure 20:
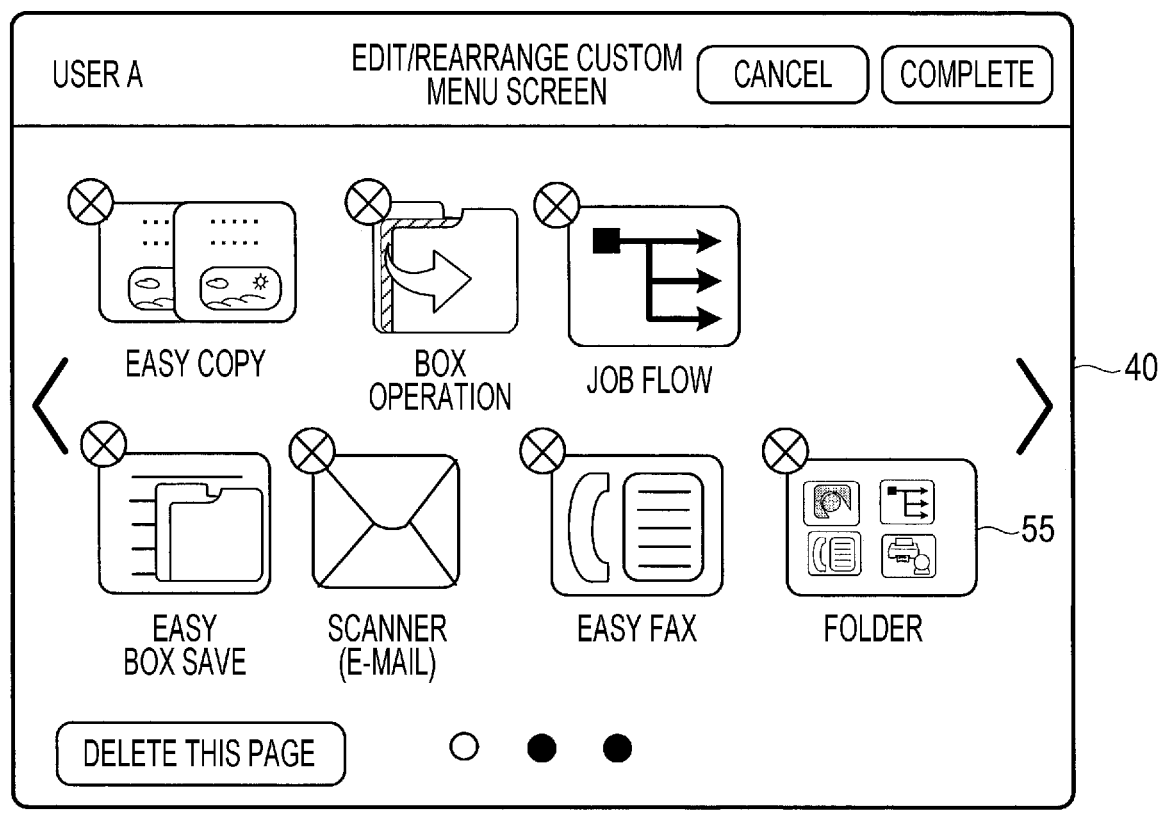
FIG. 20 is a diagram for explaining collective deletion of plural stored icons by deletion of a folder icon.

In the foregoing exemplary embodiments, a case where plural icons arranged in a page are collectively deleted has been described. However, collective deletion of plural icons is not limited to the above case. For example, in a state in which plural icons may be stored in a folder icon 55, as illustrated in FIG. 20, the present invention may also be applied to a case where the plural icons are collectively deleted by deleting the folder icon 55.

Furthermore, in the explanation for the foregoing exemplary embodiments, when the operation reception unit 35 receives a collective deletion instruction for plural icons displayed on the screen, the controller 31 displays, on a step-by-step basis, plural confirmation screens including different information contents on the display 32. In this case, the controller 31 may perform control such that plural confirmation screens for confirming whether or not individual icons are to be deleted are sequentially displayed on the display 32 on a step-by-step basis.

MODIFICATIONS

In the explanation for the foregoing exemplary embodiments, the present invention is applied to an image forming apparatus. However, the present invention is not limited to this. The present invention may also be applied to various information processing apparatuses that display icons on a screen, such as a smartphone, a tablet terminal apparatus, a mobile phone device, and a personal computer. In the case where an application is to be deleted from a smartphone, a personal computer, or the like, an uninstaller may be activated to delete the application. Therefore, the present invention may also be applied to a case where a collective deletion instruction is performed such that an uninstaller or the like is activated to delete (uninstall) plural applications.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display that is capable of displaying, as components displayed on a screen, a plurality of screen display elements on the screen;
   a reception unit that receives a collective deletion instruction as an instruction for collectively deleting the plurality of screen display elements displayed by the display; and
   a display controller that performs, in response to reception of the collective deletion instruction by the reception unit, in a case where the plurality of screen display elements for which the collective deletion instruction is issued satisfy a predetermined condition, control such that a plurality of confirmation screens for confirming whether or not deletion is to be made, the plurality of confirmation screens including different information contents, are displayed on the display on a step-by-step basis,
   wherein the plurality of confirmation screens include a first confirmation screen and a second confirmation screen that are displayed responsive to the collective deletion instruction, the first confirmation screen being different from the second confirmation screen.

2. The information processing apparatus according to claim 1,
   wherein the first confirmation screen is for indicating general precautions for execution of the collective deletion instruction for the plurality of screen display elements and then confirming whether or not the deletion is to be made, and
   wherein the second a second confirmation screen is for indicating a problem which will occur when a screen display element actually included in the plurality of screen display elements for which a current deletion instruction is issued is deleted and then for confirming whether or not the deletion is to be made.

3. The information processing apparatus according to claim 2, wherein the first confirmation screen is a confirmation screen for notifying that a problem will occur when a screen display element for performing processing of contents by a user or a screen display element having a specific function which will be invalidated by the deletion is included in the plurality of screen display elements to be collectively deleted and then confirming whether or not the deletion is to be made.

4. The information processing apparatus according to claim 1,
wherein the plurality of confirmation screens include confirmation screens for indicating, for each type of problem occurring by deletion of a screen display element, a reason for the occurrence of the problem and then confirming whether or not the deletion is to be made.

5. The information processing apparatus according to claim 4,
wherein the plurality of confirmation screens for indicating, for each type of problem occurring by deletion of a screen display element, a reason for the occurrence of the problem and then confirming whether or not the deletion is to be made include plural confirmation screens among a confirmation screen for indicating that it will take time to recreate a screen display element to recover the deleted screen display element, a confirmation screen for indicating that deletion of the screen display element will affect other users, and a confirmation screen for indicating that a valid specific function will be invalidated by deletion of the screen display element.

6. The information processing apparatus according to claim 1,
wherein the collective deletion instruction received by the reception unit is an instruction for deleting a page in which the plurality of screen display elements are arranged.

7. The information processing apparatus according to claim 6,
wherein the instruction for deleting the page is an instruction for collectively deleting all the screen display elements arranged in a same layer.

8. The information processing apparatus according to claim 6,
wherein the instruction for deleting the page is an instruction for collectively deleting screen display elements that are visible on the screen among all the screen display elements arranged in a same layer.

9. The information processing apparatus according to claim 1,
wherein the collective deletion instruction received by the reception unit is an instruction for deleting a folder including the plurality of screen display elements.

10. The information processing apparatus according to claim 1,
wherein in a case where all the plurality of screen display elements for which the collective deletion instruction is issued are screen display elements in which no problem occurs even when the plurality of screen display elements are deleted, the display controller performs control such that a confirmation screen for confirming whether or not the deletion is to be made is displayed once on the display or the confirmation screen is not displayed.

11. The information processing apparatus according to claim 10,
wherein the screen display element in which no problem occurs even when the screen display element is deleted is a screen display element corresponding to a basic function prepared in advance.

12. A non-transitory computer readable medium storing a program causing a computer to execute a process for information processing, the process comprising:
receiving a collective deletion instruction as an instruction for collectively deleting a plurality of screen display elements displayed on a screen; and
performing, in response to reception of the collective deletion instruction by the receiving, in a case where the plurality of screen display elements for which the collective deletion instruction is issued satisfy a predetermined condition, control such that a plurality of confirmation screens for confirming whether or not deletion is to be made, the plurality of confirmation screens including different information contents, are displayed on a step-by-step basis,
wherein the plurality of confirmation screens include a first confirmation screen and a second confirmation screen that are displayed responsive to the collective deletion instruction, the first confirmation screen being different from the second confirmation screen.

13. An information processing apparatus comprising:
display means for displaying, as components displayed on a screen, a plurality of screen display elements on the screen;
reception means for receiving a collective deletion instruction as an instruction for collectively deleting the plurality of screen display elements displayed by the display means; and
display control means for, in response to reception of the collective deletion instruction by the reception means, in a case where the plurality of screen display elements for which the collective deletion instruction is issued satisfy a predetermined condition, controlling such that a plurality of confirmation screens for confirming whether or not deletion is to be made, the plurality of confirmation screens including different information contents, are displayed on the display means on a step-by-step basis,
wherein the plurality of confirmation screens include a first confirmation screen and a second confirmation screen that are displayed responsive to the collective deletion instruction, the first confirmation screen being different from the second confirmation screen.

* * * * *